May 12, 1970 G. J. LISTNER 3,511,824
NOVEL POLYPROPYLENE HAVING ISOTACTIC-RANDIOTACTIC STRUCTURE
Filed March 31, 1967

INVENTOR
GREGORY JULIUS LISTNER
BY John H. Tregoning
ATTORNEY

United States Patent Office 3,511,824
Patented May 12, 1970

3,511,824
NOVEL POLYPROPYLENE HAVING ISOTACTIC-RANDIOTACTIC STRUCTURE
Gregory Julius Listner, Kendall Park, N.J., assignor to Johnson & Johnson, a corporation of New Jersey
Continuation-in-part of application Ser. No. 570,997, Aug. 8, 1966. This application Mar. 31, 1967, Ser. No. 629,056
Int. Cl. C08d 3/04
U.S. Cl. 260—93.7       21 Claims

ABSTRACT OF THE DISCLOSURE

An isotactic-randiotactic stereoblock polypropylene characterized by crystallinity and at least 1% diethyl ether solubility.

---

Figure 2:
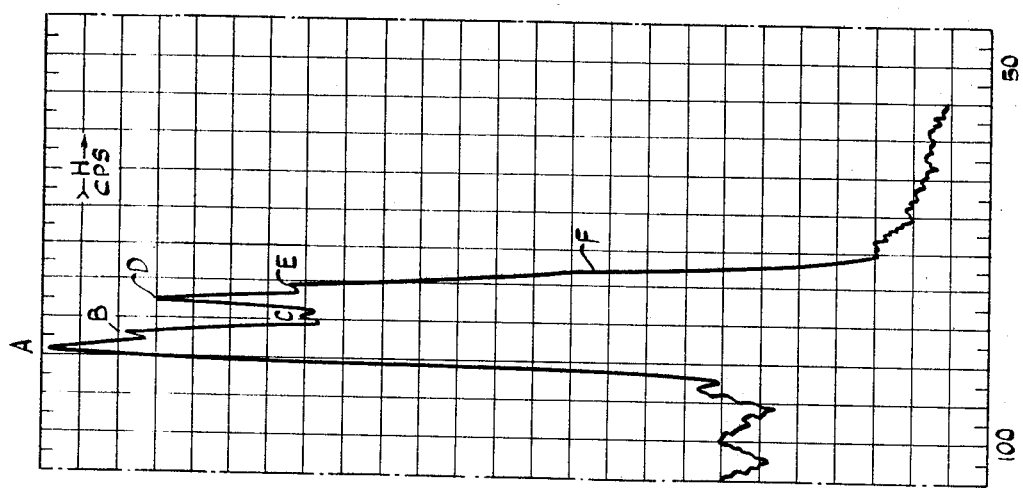

This is a continuation-in-part of application Ser. No. 570,997, filed Aug. 8, 1966.

This application relates to sterically rearranged isotactic polypropylene prepared by reacting isotactic polypropylene with a bromine compound and a free radical initiator.

Polypropylene is a relative newcomer to the thermoplastic resins and the great substance of the technology of this polymer is based largely on the earlier work originally accomplished to produce another member of the polyolefin family, i.e., linear polyethylene. Additionally, the commercial inroads made by polypropylene are predicated to a great extent on the history of the commercial success of linear polyethylene. This latter success is founded on the tremendous job of market development that the manufacturers of linear polyethylene did with respect to their product with its characteristic properties; however, the development of polypropylene provided a thermoplastic resin having many of the desirable properties of linear polyethylene, yet lacking several of the undesirable properties exhibited by that polymer.

The present invention resides in a polypropylene wherein the macromolecules comprise isotactic and randiotactic stereoisomer blocks.

The present invention thereby contributes to the characteristic features and properties of polypropylene by providing a method whereby certain of its properties can be modified in a desired manner to produce a group of polypropylene resins having a range of unusual physical properties.

Utilizing the term "configuration" as defining those arrangements of atoms which can not be altered except by breaking and reforming primary chemical bonds, it is essential, as will be seen, that the terms isotactic, syndiotactic and heterotactic configurations are also defined.

With the polypropylene polymer chain depicted in the fully extended planar zigzag configuration, if all the methyl groups lie above (or below) the plane of the main chain, it is termed isotactic, i.e.,

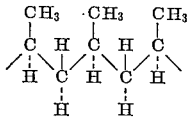

If all the methyl groups lie alternately above and below the plane, or vice versa, the configuration is syndiotactic, i.e.,

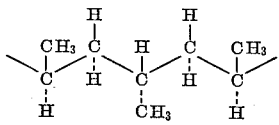

whereas, if the methyl groups are disposed such that two consecutive methyl groups are up (or down), and the next two consecutive methyl groups are down (or up), the configuration is termed heterotactic, i.e.,

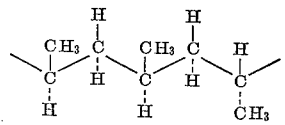

The term "randiotactic" or "randiotactic block" which characterizes the configuration of the sterically rearranged or modified blocks or segments of the instant invention is defined herein as a macromolecular combination of short length isotactic, syndiotactic and heterotactic polypropylene which is completely soluble in diethyl ether. The existence of the polymer of this invention is determined by the diethyl ether solubility exhibited by the polymer as a whole. Based upon statistics, essentially pure randiotactic polypropylene is hereby defined as having a configuration with an average combination of about 25% isotactic, about 25% syndiotactic and about 50% heterotactic polymer; however, as a practical matter these tactic constituents of the randiotatic segments are present within general ranges such that the heterotactic segment(s) constitutes from about 40% to about 60% of the whole, and the isotactic segment(s) and syndiotactic segment(s) each constitute from about 20% to about 30% of the whole. These randiotactic blocks are substantially randomly positioned along the polymer chains of the polypropylene of this invention and are linked to isotactic blocks or segments of polypropylene polymer.

More specifically, this invention provides substantially linear, head-to-tail, stereoblock polymers of polypropylene, the macromolecules of said block polymers being characterized by possessing both helical isotactic as well as randiotactic steric configurations and diethyl ether solubility.

The polymers of this invention are defined by a diethyl ether solubility ranging from at least about 1% to about 100% dependent upon the extent of the modification that the starting helical isotactic polypropylene has undergone via the process of this invention. Preferably the instant polymers are defined by a melting point peak of from about 165° C. to about 50° C. as determined by differential thermal analysis and an isotacticity number, or index, which gives the measure of the amount of original helical isotactic content in the polymer as a whole, of from about 80% to about 15%. However, as the macromolecules of this invention which are completely, or substantially completely, racemized increase in number with respect to the whole, the crystallinity, melting point peak, tensile strength and tack temperature of the polymer are each reduced since the completely, or substantially completely, racemized polymers exhibit no crystallinity, low tensile strength, no discernible melting point peak, high elasticity and are tacky below 100° F.

The polymers of this invention having attractive use properties, have a diethyl ether solubility of at least about 2%, a melting point peak of between about 120° C. and about 50° C. and a remaining helical isotactic content of up to about 65%; however, the rearranged polymers having the most attractive use properties will have a diethyl ether solubility of at least about 10%, a melting point peak of between about 105° C. and 50° C. and a remaining helical isotactic content of up to about 50%.

The polypropylene stereoisomers of this invention are produced by reacting at least about 0.01% by weight of a free radical initiator, commonly an organic peroxide (and unless otherwise specified throughout, this and all other percentages by weight are based on the total weight of the composition in question) and at least about 0.04% by weight of a bromine compound with substantially isotactic polypropylene at a temperature within the range of from about 325° F. to about 600° F.

By "substantially isotactic polypropylene" is meant essentially a boiling n-heptane insoluble and diethyl ether insoluble polypropylene having a helical isotactic content of at least 90% by weight and preferably at least about 97%. It must be in a physical form such as to provide an intimate mixture with the bromine compound and the free radical initiator compound. Desirably, it is in flake or particulate form; however, it should not be so fine as to lose its free-flowing properties. It is desirable that the polypropylene used be at least of a sufficient particle size so as to not pass through a 100 mesh screen, and preferably coarser, since with smaller particle sizes the free-flowing properties of the resin begin to diminish. Of course, this can be overcome by pelletizing. However, the particle size, desirably, should not become so coarse as to not pass through a 4 mesh screen, since problems with obtaining an intimate polymer blend appear and the completeness of the desired reaction is thus jeopardized.

The isotactic polyproplyene should be free of stabilizers or other additives reactive with the organic peroxide compound or the organic bromine compound to destroy, or seriously hamper, the intended reaction. Also, since a molecular weight reduction may occur in the reaction of this invention, the initial polypropylene resin should preferably have a weight average molecular weight of at least about 100,000.

As used herein, the free radical initiator, which is preferably an organic peroxide, is a chemical compound capable of yielding a free radical, i.e., a radical having an unpaired electron, which will act to initiate the reaction while the starting polypropylene is in the noncrystalline state. Since a temperature of about 325° F. appears to be the temperature at which crystallinity begins to disappear, the organic peroxide must be essentially nonreactive below that temperature. Also, since the free radical initiator compond will decompose to form free radicals, defining it by saying that it must be essentially nonreactive below about 325° F. is simply to require that if it does decompose below that temperature the decomposition is slow or minor enough so that at the reaction temperature of about 325° F. there are still a substantial number of free radicals present to permit the reaction. Of course, it is preferred that the free radical initiator is completely nonreactive below about 325° F.

Additionally, this free radical initiator must liberate free radicals at a temperature where the starting polypropylene is sufficiently reactive so that the racemization reaction is favored over the thermal degradation reaction, i.e. preferably below 600° F. and most preferably below 500° F. This free radical initiator must also have a half-life (as reported in Industrial & Engineering Chemistry—Product Research & Development, vol. 3, No. 4, December 1964, pages 269–277, "Influence of Peroxide Curing Systems and Carbon Blacks in Ethylene-Propylene Rubber") at, or above, 320° F. in the order of at least one or more minutes, and preferably three and one-half minutes or greater, to enable it to foster the desired reaction. Also, it should be free of additives, such as antioxidants, that would interfere or compete with or otherwise hamper the reaction.

In the process of this invention, the free radical initiator must be present in an amount sufficient to provide an activity equivalent to at least about 0.001% and preferably 0.004% by weight active oxygen, where "active oxygen" is defined as the amount of oxygen in the free radical initiator that will react at reaction temperature, i.e., from about 325° F. to about 600° F., to give free radicals capable of causing removal of the hydrogen of the tertiary carbon of the polypropylene molecule. When the free radical initiator is an organic peroxide, it has been determined that most such peroxides will satisfy this requirement when present in an amount of at least about 0.01% by weight and preferably 0.04% by weight, based on the total weight. Most preferably, the organic peroxide should be present in an amount of at least about 0.1% such that the polypropylene polymer during reaction, will contain at least about 0.01% by weight active oxygen.

More specifically, while the process of this invention requires the presence of at least a given minimum amount of both the organic peroxide and the bromine compound, the ratio of active bromine in the bromine compound to the active oxygen in the organic peroxide is also very important. Preferably the active bromine to active oxygen ratio should be about 10:1 where the former is based on one atom of active bromine per mol of bromine compound and the latter is based on the active oxygen content or active oxygen-equivalent content of the free radical initiator compound. Utilizing this preferred ratio, there is sufficient active bromine present substantially to suppress chain scission of the polypropylene, which would reduce molecular weight and there is insufficient active bromine present in the process to provide evidence of bromination.

The use of up to about 1.5% by weight of organic peroxide, so that the polymer contains up to about 0.2% active oxygen, is sufficient in the process of this invention. The use of amounts in excess of 1.5% by weight organic peroxide are economically unsound at about the preferred active bromine to active oxygen ratio since additional benefits are not thereby provided.

The free radical initiator compound can function to lower the weight average molecular weight of the polypropylene as much as about 65% but preferably no more than 30%, based on the original molecular weight of the polypropylene polymer during, and as a result of, the reaction of this invention.

The free radical initiator must react at the aforegiven reaction temperature at a sufficient rate to perform its intended function in this process.

Since an intimate contact between the polypropylene and the reactants is desired because of the short duration of the reaction and for reasons of uniformity of the reaction product, the free radical initiator must be capable of being substantially uniformly dispersed with the polymer; therefore, it must be in particulate-solid, gaseous or liquid form. A large particle size would be acceptable if the compound became fluid at, or just prior to, reaction temperature. Representative examples of an organic peroxide defined by the foregoing requirements are dicumyl peroxide, 2,5-dimethyl-2,5-bis (tert butylperoxy) hexane, 2,5-dimethyl-2,5-bis (tert butylperoxy) hexyne-3, di (tert butyl) peroxide, and mixtures of free radical initiators; as for example, where one such free radical initiator will not by itself fully satisfy the requirements given herein for such a compound, but a combination of two or more such free radical initiators as defined herein does satisfy these requirements.

The "bromine compound" is preferably an organic bromine compound which is reactive, or can be made reactive with proper catalytic systems, in the presence of the free radical initiator at, or above, about 325° F. and preferably at that temeprature above 325° F. where the particular free radical initiator utilized liberates the greatest proportion of its free radicals. It must be reactive at the same time that the free radical initiator is undergoing substantial free radical liberation. The bromine compound acts to prevent lowering of the weight average molecular weight.

The bromine compound must be dispersible in, or capable of being made dispersible in, the polypropylene under reaction conditions, be nonreactive in the sense that it will not induce or participate in side reactions to detrimentally interfere with the intended reaction. It must also be dispersible, with or without the aid of dispersants, with the polypropylene polymer and the organic peroxide compound at the reaction temperature so that intimate contact with these constituents is effected at the time of the reaction.

The bromine compound must contain one or more bromine atoms, one or more of which are capable of being activated by a free radical of the free radical initiator to achieve an active bromine to active oxygen (or active oxygen-equivalent) ratio of from about 0.2 to 1, to about 100 to 1 or greater.

The preferred active bromine to active oxygen ratio has been given as about 10:1, and, at this ratio certain characteristic physical property changes are effected as the amounts of free radical initiator and the bromine compound are increased. However, certain of these physical properties can be otherwise altered by changing the ratio of bromine to oxygen. This will be discussed later.

The bromine compound must be present in an amount of at least about 0.04% by weight and preferably about 0.4% by weight so that the polymer reactant mixture has at least about 0.005% by weight and preferably 0.05% by weight active bromine (based on one atom of bromine being activated per mol of the bromine compound). The "active bromine" is defined as that portion of the total bromine content of the compound that is, or can be, released at the aforegiven reaction temperature to provide bromine radicals. Most preferably the bromine compound will be present in about 1% by weight and contain 0.1% by weight of active bromine. It is unnecessary to utilize in excess of 10% by weight of organic bromine compound since no additional desirable property changes are effected in the propylene stereoisomer.

It is also important to note the fact that following the process of this invention there is no significant amount of bromine attached, or in evidence, in the sterically rearranged polypropylene produced.

With less than 0.005% by weight of active bromine utilized in the process of this invention, the basic isotactic polypropylene simply undergoes a decrease in molecular weight with an increase in its brittleness and there is no evidence of the required diethyl ether solubility.

Representative examples of the organic bromines are tris (2,3-dibromopropyl) phosphate, 1,2-dibromocyclohexane, $\alpha,\alpha'$-dibromo-p-xylene, "B52RS," an organic bromine phosphate supplied by Monsanto Chemical Corporation, 1,1,2,2-tetrabromoethane, 1-bromododecane, 2,3-dibromopropanol, carbon tetrabromide and mixtures of these and other bromine compounds as defined herein.

It is clear that the instant reaction effects a racemization to provide a stereo-rearranged polypropylene; however, to effect this stereoisomerization, the isotactic polypropylene resin is converted, at least in part, to a noncrystalline form at which the temperature where the free radical initiator liberates substantially the greatest number of its free radicals and where the bromine compound is activated. Activation of the organic bromine while the organic peroxide is not liberating any, or at least insufficient, free radicals, may effect bromination of the polypropylene. On the other hand, if the organic peroxide is activated and the organic bromine is not, hydrogen may be removed from the polymer which would cause it to split, and thus not provide the specifically modified polymer of this invention; therefor, it is essential that both the organic bromine and the organic peroxide are present and reactive at the proper temperature. It is desirable that the reaction take place quickly in order that it is most efficient; however, in the event that the half-life of the organic peroxide is short, it is important that the organic bromine be activated substantially completely at the reaction temperature which causes the peroxide to release free radicals, in order to insure against chain scission. The degree of rearrangement is dependent on the amount of reactants present and the active bromine to active oxygen ratio, as well as on the temperature at which the reaction is performed.

The active bromine to active oxygen ratio utilized is a determinate of certain of the physical property changes that can be effected in the starting isotactic polypropylene by virtue of the instant process. At, or near, the preferred active bromine to active oxygen ratio of 10:1, there is an increase in diethyl ether solubility and elastic recovery values while there is a decrease in melting point and isotacticity as determined by infrared and tangential modulus values over these same values defining the starting polypropylene. These changes are brought about by the presence of the minimum amounts of free radical initiator with the corresponding presence of the bromine compound dictated by the given ratio in the process of this invention, and the values are further increased or decreased, as the case may be, by increasing the amounts of each constituent in keeping with this given ratio. Thus, utilizing the above ratio of about 10:1 and a minimum value for the free radical initiator of about 0.01% by weight containing about 0.001% by weight active oxygen, the corresponding values of the reaction product for the properties discussed above are: diethyl ether solubility of about 1%, a melting point peak of about 165° C., an isotacticity as determined by infrared of about 80%, a tangential modulus of about 25,000 p.s.i. and no significant change in elastic recovery.

Increasing the amount of free radical initiator to the preferred minimum amount and utilizing the same active bromine to active oxygen ratio provides a rearranged polypropylene polymer having a diethyl ether solubility of about 2%, a melting point peak of about 120° C., an isotacticity as determined by infrared of about 65%, a tangential modulus of about 5,500 p.s.i. and an elastic recovery of about 12%. Utilizing the most preferred minimum of about 0.1% by weight free radical initiator having about 0.01% by weight of active oxygen in the reactants provides a polymer with a diethyl ether solubility of about 10%, a melting point peak of about 100° C., an isotacticity as determined by infrared of about 50%, a tangential modulus of about 1,500 p.s.i. and an elastic recovery of about 66%.

At about 100% diethyl ether solubility obtained in a polypropylene rearranged in accordance with the process of this invention using an active bromine to active oxygen ratio of about 10:1, the melting point peak is found to be about 50° C. or lower, the isotacticity as determined by infrared is about 15%, the initial tangential modulus is about 25 p.s.i. and the elastic recovery is about 100%.

The molecular weight of the sterically rearranged polypropylene is not significantly affected as compared to that of the starting polypropylene when this preferred ratio of about 10:1 is used even as the amounts of constituent reactants are increased.

As the bromine compound is increased, the values for diethyl ether solubility, melting point and helical isotactic content respond substantially as they do at the 10:1 ratio; however, the elastic recovery increases and the tangential modulus decreases at a rate generally greater than the rate in evidence at about the 10:1 ratio, due to plasticization of the stereoisomer formed by the bromine compound. This rate of change, as to elastic recovery and tangential modulus, can be accelerated as the amount of bromine compound is increased or as other compatible plasticizers are included. The molecular weight shows no significant change; however, if an excess of active bromine is liberated, i.e., above a ratio of about 10:1, in the reaction, due in part to thermal activation of the bromine, then brominating of the polypropylene can occur with an accompanying reduction molecular weight of up to about 10%.

As the active bromine to active oxygen ratio is decreased the values of diethyl ether solubility, melting point and helical isotactic content respond similarly to these same values at the preferred ratio of active bromine to active oxygen; however, the rates at which elastic recovery increases and the tangential modulus decreases are reduced as the ratio is decreased. Also the molecular weight of the reaction product is decreased as the bromine to oxygen ratio is decreased. At a ratio of about 1:1, the molecular weight will decrease rapidly due to chain scission and below a ratio of about 0.2:1 a desirable commercial product is no longer produced. Therefore, the weight average molecular weight shall not be depressed below about 65,000.

The temperature of the instant reaction is at least about 325° F. since it is found that this is the temperature at which conversion of crystalline isotactic polypropylene to noncrystalline begins to take place in this reaction. The presence of additives necessary, or desired, in the reaction does apparently affect the temperature at which the conversion will occur; therefore, the exact temperature of the first possible reaction is limited somewhat by the contributions of the reactants toward the crystalline-to-amorphous conversion temperature of the polypropylene polymer. Also, factors such as ambient pressure will modify the temperature at which isotactic polypropylene begins to lose its crystallinity to become amorphous. Preferably the temperature should not exceed 600° F. and most preferably 500° F. since above this temperature thermal degradation of the basic isotactic polypropylene can occur.

In some instances the presence of certain other additives in the reaction blend is desirable in order to enhance certain properties. For example, a nonreactive dispersant such as stearic acid may be added to the reaction to enhance the blend of constituents. If such a dispersant is utilized, it should preferably be present in an amount of at about from 0.1% and desirably not in excess of about 1.5% by weight. With blends containing an amount of organic bromine and organic peroxide in excess of about 5%, the use of a dispersant in the above-specified amount is most desirable; however, even with lesser amounts of reactants present, it does aid extrusion and dispersion, and thus contributes to produce a more uniform product.

Certain additives such as coloring pigments, stabilizers, antioxidants, etc., may be added in order to attain specific end results; however, it is desirable that these additives do not react with the polymer or the two primary reactants such as to retard, impede or otherwise hamper or even destroy the essential reaction.

The ingredients may be blended together with the polypropylene polymer by thorough blending or mixing, if all components are in finely divided form sufficient to provide an intimatet mixture; however, to facilitate the blending of the ingredients the organic peroxide and the organic bromine together with the dispersant, e.g., stearic acid, if one is used, are preferably premixed using a hot water bath at from about 150° F. to about 200° F. (and preferably not above 175° F.) to form a hot solution which is then added to the polypropylene resin in the mixer. If other additives such as carbon, pigments, antioxidants, U.V. stabilizers, etc., are desired in the system, they should be added in concentrated form after the conversion of the isotactic polypropylene so that they will not interfere with the reaction by, for example, reacting with the reactants or the polypropylene.

After a thorough mixing for preferably at least about ten minutets, the blend is suffiicently free-flowing to make a feed for an extruder. It is important to note that while typical extrusion reaction conditions are being outlined, the blend can also be reacted by other means which permit rapid heating (to at least about 325° F.) of the polymer so that activation of the reactants occurs when the polymer is amorphous. This can be accomplished, for example, in a press, a hot air oven, or under infrared heat.

Precaution must be taken in preparing the premix that the free radical initiator and bromine compound premixture is not heated either too long at 150° F. (preferably beyond about 30 minutes) or that this temperature does not exceed 200° F. If either of these occurrences is allowed, some premature decomposition of the reactants can result and the efficiency of over-all reaction could be reduced.

The reaction time must be such as to permit the stereo-rearrangement, but not of such duration as to allow polymer degradation and the formation of contaminates. In general a reaction time exceeding fifteen minutes will facilitate the existence of polymer degradation.

In terms of a commercial product, a stabilizer, an antioxidant, an ultraviolet absorber, etc., should be added to provide, in the stereoisomer, a resistance to aging at high temperature (thus a resistance to degradation in standard processing equipment) and to enhance its resistance to weathering and discoloration. These additives are desirably added to the stereoisomer of this invention since they can interfere in varying degrees with the desired reaction, i.e., it is preferred that they are blended into the sterically rearranged polypropylene, i.e., after the reaction is complete.

An antioxidant should be present in the system in an amount of from about 0.05% to about 2% by weight. The antioxidants utilized must be compatible with polypropylene at extrusion and service temperatures, i.e., they must be nonexuding, but they must also have sufficient heat stability at extrusion temperature to permit the extrusion of the sterically rearranged polypropylene. Since the antioxidant(s) is desirably added after the formation of the polyyropylene isomer, the reactivity of the antioxidant(s) must be such that it does not decompose any of the residual reactants to develop polymer discoloration or some other undesirable property. They should also possess color stability such that there is little or no color change during or after extrusion, or during the reasonable life of the polymer. They should possess good water resistance such that moisture will not leach them from the final product. Representative of antioxidants which fall within this definition are 2,6-di-t-butyl-p-cresol; 4,4' - thio - bis(3-methyl-6-t-butyl phenol); 4,4' - butylidene- - bis(3-methyl-6-t-butyl phenol); 2,2' - methylene bis(4-methyl-6-t-butyl phenol); 2,2' - methylene bis(4-methyl-6-t-nonyl phenol); 2,2' - thio - bis(4-methyl-6-t-butyl phenol); 2,4,5 - trihydroxybutyrophenone; "RA-1093" and "Irganox 565," 858, 1076 and 1093, all manufactured by Geigy Chemical Company; "Santanox," a dialkyl phenol sulfide manufactured by Monsanto Chemical; "Topanol C.A.," a 3:1 condensate of 3-methyl-6-tertiary butyl-phenol with crotonaldehyde manufactured by Imperial Chemical; "Nonox WSP" and "Nonox CL" manufactured by Arnold Hoffman & Company; American Cyanamid's two phenolic antioxidants 2246 and 425; Ethyl Corporation's 703; and Shell Chemical Company's butylated hydroxy-toluene. Antioxidants normally used by the art in the preparation of isotactic polypropylene should lend themselves to use in the system of this invention.

Another additive is desirably included with the antioxidant and is represented by di-lauryl-thiodipropionate, di-stearyl-thiodipropionate, or "Stereobane 20," a modified polymeric thioester manufactured by Halby Products Company, in an amount sufficient to provide from about 0.05% to about 2% by weight in the final polymer. From about 0.1% to about 0.5% by weight is preferred. This particular additive is desired since it is synergistically reactive with the antioxidant and it imparts heat stability to the final polypropylene reaction product.

As stated earlier, the process of this invention produces polypropylene which has undergone stereoisomerization to effect an isotactic-randiotactic polypropylene isomer. Isotactic polypropylene is insoluble in diethyl ether, while randiotactic polypropylene is substantially completely soluble in diethyl ether. Thus the fact of the stereoisomerization, with resultant molecular rearrangement to develop randiotactic blocks or segments in the basic isotactic polypropylene polymer, is evidenced by the development of diethyl ether solubility in the reaction product which can be varied from about 1% to about 100%. The polypropylene of this invention may also be characterized by its improved resistance to high energy radiation and ultraviolet light as opposed to that exhibited by the starting isotactic polypropylene and can be more readily effectively stabilized to resist this energy.

The existence of the randiotactic-isotactic polypropylene polymer is also established by the NMR "fingerprint" reflected by the polypropylene isomers of this invention.

Figure 1:
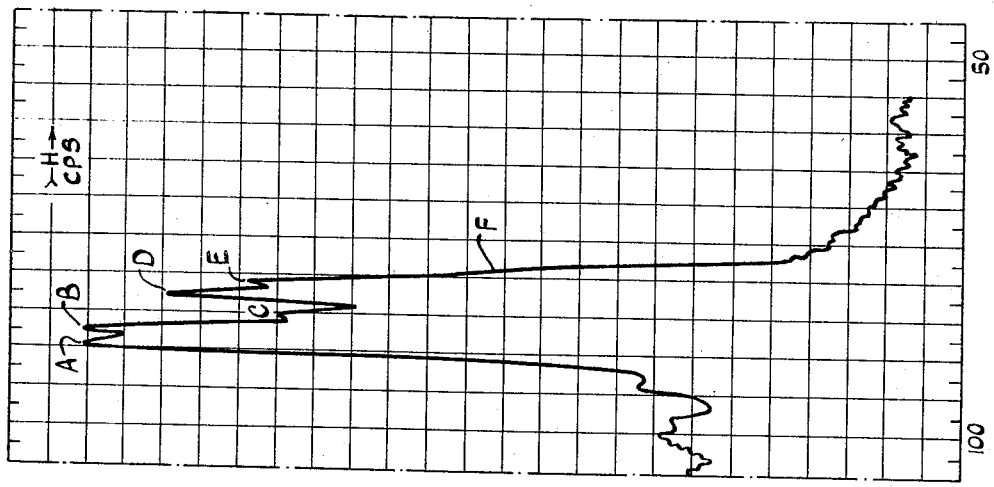

With specific reference to FIGS. 1 and 2 (which report NMR analysis of the polypropylene isomers produced via Examples X and XVIII respectively) the analysis was performed utilizing a Varian Associates HA-100, 100 megacycle NMR Spectrometer at a range of 80–90 cycles per second.

The NMR spectra given for both polypropylene isomers are similar even though the isomer tested and reported via FIG. 1 have a corrected diethyl ether solubility of about 50%, and the isomer of FIG. 2 has a diethyl ether solubility of about 75%. The existence of doublets at 89 and 83 c.p.s. (points A and D respectively) report isotactic placement, while doublets at 85 and 79 c.p.s. (points C and F respectively) report syndiotactic placement and doublets at 87 and 81 c.p.s. (points B and E respectively) report heterotactic placement. The area given by the doublets at B and E is always greater by a factor of about two than the area given by the doublets at C and F. The NMR "fingerprint" characterizing the presence of the polypropylene stereoisomer of this invention is thus established.

Infrared techniques measure the amount of coiled isotactic content in the polymers of this invention, to establish that the polypropylene isomers are defined as having an average presence of helical isotactic content in the macromolecule of from about 80% (at about 1% diethyl ether solubility) to about 15% (at 100% diethyl ether solubility). (All infrared data presented herein was obtained using a Perkin-Elmer Model 21 Infrared Spectrophotometer where the isotactic content was calculated by comparing the ratio of the areas at 1002 microns to the area at 1027 microns.)

With the modification of the basic isotactic polypropylene to effect the measurable presences of the polypropylene isomer of this invention, i.e., with at least about 1% diethyl ether solubility established in the isomer, the melting point peak is found to have been depressed about 10° C., while with such modification as produces the 100% diethyl ether soluble polypropylene stereoisomer, the melting point peak is found to have been depressed about 120° C. or more.

With the practice of the process of this invention, the starting isotactic polypropylene is sterically modified such that its crystallinity is decreased; however, while optical crystallinity does disappear, as the diethyl ether solubility of the polymer becomes substantial, some measurable crystallinity appears to persist even at 100% diethyl ether solubility.

With the reduction in crystallinity, properties of the polymer such as tensile strength and density are decreased, while elasticity and elastic recovery are increased. In fact the physical properties of the polymer can be predictably controlled to conform to certain desired end uses and these polypropylene isomers can find uses in extruded sheeting, gasketing, electrical insulation, collapsible tubes, textile filaments, shrink package tubing, cling film, packaging film, hot melt adhesives, solvent adhesives and injection molded articles.

The following examples illustrate the manner of using the claimed process of the invention for the preparation of the claimed polypropylene isomers.

In each instance the diethyl ether solubility was measured by placing a one gram sample in a Soxhlet Extractor and extracting for six hours with 250 millimeters of diethyl ether. The residue was transferred to an aluminum dish and dried under vacuum overnight at 55° C. The amount of diethyl ether solubility was calculated by determining the weight difference in the sample placed in the Soxhlet Extractor and the sample after drying. The corrected diethyl ether solubility was determined by subtracting from the total ether solubility the amounts of the ingredients, i.e., the organic peroxide, the organic bromine, etc., that had been added to prepare the initial sample.

Elastic recovery was measured using an Instron Model TM instrument. An unoriented extruded filament or a film of the polypropylene stereoisomer was extended 100% using a jaw spacing of four inches, a cross head speed of four inches per minute and a chart speed of eight inches per minute. After the sample had been extended 100%, the load was released and the amount of recovery was reported as the elastic recovery.

The initial tangential modulus was measured using ASTM E-111-61. The test was run using a five-inch jaw spacing, five inches per minute cross head speed and a chart of 50 inches per minute.

Tensile behavior was measured according to ASTM D 1708-59T using microtensile specimens cut from pressed sheet which had been lightly dusted with talc to prevent specimens from sticking during handling.

The molecular weight was determined utilizing a Waters Associate Model 200 Gel Permeation Chromatograph. The solvent was 1,2,4-trichlorobenzene at a temperature of 138° C. with a flow rate of 1 cc. per minute. The sample concentration was ¼% with an injection time of 120 seconds (a 2 milliliters sample). The calibration code used was D & R C–1. The gel columns used were $3 \times 10^6$, $1 \times 10^5$, $3 \times 10^4$ and $3 \times 10^3$ Angstroms. The Q value was determined by using values from identical polypropylene samples measured by both gel permeation chromatograph and osmomotry.

"Melting point" as used throughout this specification, with respect to the polypropylene stereoisomers of this invention, is the melting point determined by differential thermal analysis using a Model LAXYH recorder-controller; a Model J-2 furnace platform; a Model FIDF furnace and a Model SH–11BR2–ALZ sample holder as manufactured and sold by Robert L. Stone. A 10 mg. sample of the polypropylene iosmer is programmed for a 16 C degrees per minute temperature rise. The melting point temperature is taken at the maximum endothermic peak on the DTA curve. This instrument and this technique measures the melting point of that portion of the polymer that has crystallized.

Unless otherwise specified the percents by weight of the constituents in the reaction are based on the total weight of the constituents.

EXAMPLE I

100% by weight "Profax 6501" isotactic polypropylene manufactured by Hercules Powder Company and having a particle size such as to pass through a 40 mesh screen and be contained by a 100 mesh screen is added to a 24:1 L/D extruder utilizing a chrome plated screw with a ⅔ feed section, ⅓ metering and 4.5:1 compression. A 40/100 mesh screen pack is utilized to aid extruding conditions. The temperature in the extruder is 450° F. A monofilament is extruded, quenched in water and tested to determine its physical properties. It has a weight average molecular weight of 214,000, a number average molecular weight of 31,800, a corrected diethyl ether solubility of 0%, a melting point peak at 173° C., an elastic recovery of 7.5%, an infrared isotacticity content of 90% and a tangential modulus of 50,000 p.s.i.

EXAMPLE II 0.02% by weight of the organic peroxide 2,5-dimethyl-2,5-bis(tert-butylperoxy) hexyne-3 and 3.8% by weight of tris-(2,3-dibromopropyl) phosphate together with 0.2% by weight stearic acid are premixed in a hot water bath at a temperature of 160° F. for about ten minutes. This premix is added to 96% by weight finely divided isotactic polypropylene having a particle size that pass through a 40 mesh screen and would be contained by a 100 mesh screen, which is the commercial resin "Profax 6501" sold by Hercules Powder Company. The resultant mixture is thoroughly mixed for a period of about ten minutes or until the blend is very free flowing.

If larger amounts of total reactant additives, i.e., above 8%, are desired, the entire blend can be mixed at about 150° F. to aid absorption of the additives into the resin and to insure free-flowing properties. In that event the isotactic polypropylene resin is heated to about 150° F. separately and then combined with the preheated premixture as described above.

The reaction is carried out in a one inch 24:1 $L/D$ extruder using a chrome plated screw with a ⅔ feed section, ⅓ metering and 4.5:1 compression. A 40/100 mesh screen pack was utilized to aid extruding conditions. The temperature in the extruder was 400° F. The polymer was extruded in monofilament form and quenched in water.

The resultant sterically rearranged polypropylene has a corrected diethyl ether solubility of 2.1%, an isotacticity, determined by infrared, of 65%, a number and weight average molecular weight of 33,600 and 194,000 respectively and an initial tangential modulus of 15,460 p.s.i. Even with an excess of bromine compound in the reaction, the weight average molecular weight of "Profax 6501" isotactic polypropylene is not reduced below about 190,000.

The melting point of the reaction product of this example has a peak at 120° C. whereas the melting point peak of "Profax 6501" polypropylene was 173° C.

The tensile strength of the unoriented reaction monofilament is 6,400 p.s.i. which was determined using ASTM D-412-62-T and it exhibited an elastic recovery of 15%.

EXAMPLE III

The procedure of Example II is followed except 0.10% by weight 2,5-dimethyl-2,5-bis(tert-butylperoxy) hexyne-3, 0.61% by weight tris(2,3-dibromopropyl) phosphate, 0.09% by weight stearic acid and 99.2% by weight "Profax 6501" isotactic polypropylene are used. The corrected diethyl ether solubility of the reaction product is 8%, the elastic recovery is 32% and the tensile strength is 11,700 p.s.i. The initial tangential modulus, isotacticity by infrared and the melting point peak of this polypropylene isomer are 25,300 p.s.i., 54.4% and 106° C. respectively, while the number average molecular weight is 27,700 and the weight average molecular weight is 126,000.

EXAMPLE IV 0.3% by weight of 2,5 - dimethyl-2,5-bis(tert-butylperoxy) hexane, 3.8% by weight tris-(2,3 - dibromopropyl) phosphate and 0.2% by weight stearic acid are premixed and added to 95.7% by weight "Profax 6501" polypropylene following the procedure of Example II. The resin blend was extruded following the procedure of Example II. It had a corrected diethyl ether solubility of 59%, an initial tangential modulus of 36 p.s.i., an infrared isotacticity content of 19.5%, a melting point peak at 103° C., a number average molecular weight of 32,800 and a weight average molecular weight of 200,000. It had an elastic recovery of 73% and a tensile strength of 80 p.s.i.

EXAMPLE V

Following the procedure of Example II, 0.5% by weight of dicumyl peroxide, 4% by weight tris-(2,3-dibromopropyl) phosphate and 0.5% by weight stearic acid are premixed and blended with 95% by weight "Profax 6501" isotactic polypropylene. Monofilaments are extruded having a corrected diethyl ether solubility of 91% and elastic recovery of 25%, a tensile strength of 500 p.s.i. and an initial tangential modulus of 310 p.s.i.

EXAMPLE VI 0.05% by weight 2,5-dimethyl-2,5-bis(tert-butylperoxy) hexane, 3.8% by weight tris-(2,3-dibromopropyl) phosphate, 0.2% by weight stearic acid and 96% by weight "Profax 6501" isotactic polypropylene are thoroughly blended at a temperature of 160° F. for a period of ten minutes until the blend is free flowing and then following the extrusion procedure of Example II, monofilaments are extruded and tested. The monofilaments had a corrected diethyl ether solubility of 14.5%, an initial tangential modulus of 6,340 p.s.i., a melting point peak at 60° C., an elastic recovery of 75% and a tensile strength of 6,600 p.s.i.

EXAMPLE VII

Following the procedure of Example VI, 0.2% by weight of 2,5-dimethyl - 2,5 - bis(tert-butylperoxy) hexyne-3, 4% by weight tris-(2,3-dibromopropyl) phosphate, 0.2% by weight stearic acid, 2% by weight carbon black concentrate and 93.6% by weight "Profax 6501" isotactic polypropylene are blended and extruded in monofilament form. These monofilaments had a corrected diethyl ether solubility of 19.9%.

EXAMPLE VIII 0.2% by weight dicumyl peroxide, 4.5% by weight 1,2-dibromocyclohexane, 0.5% by weight stearic acid are premixed, blended with 94.8% by weight "Profax 6501" polypropylene and extruded into monofilaments following the procedure of Example II. The resultant monofilament had a corrected diethyl ether solubility of 87.7%, an initial tangential modulus of 582 p.s.i., an elastic recovery of 92% and a tensile strength of 1,100 p.s.i.

EXAMPLE IX 0.2% by weight 2,5-dimethyl-2,5-bis(tert-butylperoxy) hexyne-3, 4% by weight 1,1,2,2-tetrabromoethane 0.20% by weight stearic acid are premixed, blended with 95.6% by weight "Profax 6501" polypropylene and extruded into monofilaments following the procedure of Example II. The monofilaments had a corrected diethyl ether solubility of 90%.

EXAMPLE X 0.2% by weight dicumyl peroxide, 4.3% tris-(2,3-dibromopropyl) phosphate, 0.5% stearic acid are premixed and blended with 95% "Profax 6501" polypropylene following the procedure of Example II. Following that same procedure the dry blend is extruded into a rod form. A portion of the rod is banded on a 3 inch x 8 inch differential speed two-roll mill at 220° F. 0.2 part by weight 4,4-thio bis(6-tert-butyl-cresol) in small particle form is added and the mixture masticated for five minutes. Samples 6 inches x 6 inches x 0.045 inch are pressed between polished plates for one minute at 325° F. These sheets are cut into ¾ inch squares and aged in a 325° F. circulating air oven. After three hours, the samples exhibited no sign of tackiness, whereas identical samples not containing the antioxidant were tacky after 15 minutes.

The samples containing the antioxidant have a corrected diethyl ether solubility of 49.1%, an isotacticity content as determined by infrared of 18.1%, a melting point peak at 63° C., a number average molecular weight of 52,000, and a weight average molecular weight of 268,000.

An additional sample is prepared using the same weight percentage of dicumyl peroxide, tris-(2,3-dibromopropyl) phosphate, stearic acid and "Profax 6501" polypropylene. This sample is extruded into 25 mil monofilaments following the procedure of Example II. The monofilaments so produced are completely dissolved in orthodichlorobenzene and the resultant viscous liquid is poured over glass wool. Acetone is poured over the orthodichlorobenzene solution and the rearranged polypropylene is precipitated. The precipitated polypropylene is placed into a Soxhlet extractor and solvent extracted with acetone, a known solvent for tris-(2,3-diboromopropyl) phosphate. After extraction the polymer is recovered by dissolving in orthodichlorobenzene. The recovered polymer is analyzed for bromine using X-ray analysis, and it is found to have about 0.05% by weight bromine present. The polymer is reprecipitated, dried and tested, and no significant changes in the physical property values reported earlier in this example are found.

EXAMPLE XI

Following the procedure given in Example X, 0.2% by weight dicumyl peroxide, 4.3% by weight tris-(2,3-dibromopropyl)phosphate, 0.5% by weight stearic acid are premixed, blended with 95% by weight "Profax 6501" isotactic polypropylene and extruded into rods. The extruded rod of sterically modified polypropylene are then chopped and fed into a 1½ inch Modern Plastics' extruder with a 14:1 L/D screw, extruded through a 10 inch wide slit film die casted on a roll and wound up using a rubber squeeze roll. A brown film 30 mils thick exhibiting properties very similar to the sheet or film produced via the procedure of Example X is produced.

EXAMPLE XII

Following the procedure of Example II, monofilaments are prepared utilizing 0.1% by weight dicumyl peroxide, 4% by weight tris-(2,3-bromopropyl) phosphate and 95.9% by weight "Profax 6501" polypropylene. The monofilaments had a corrected diethyl ether solubility of 15.6%, an initial tangential modulus of 16,400 p.s.i., an elastic recovery of 68% and a tensile strength of 4,900 p.s.i..

EXAMPLE XIII

Following the procedure of Example II, 4% by weight of tris-(2,3-dibromopropyl) phosphate, 0.5% by weight stearic acid and 95.5% by weight "Profax 6501" polypropylene are mixed and extruded into monofilaments. The corrected diethyl ether solubility of the reaction product is about 1%, the isotacticity as determined by infrared is 99%, the elastic recovery is 6% and the tensile strength is 7,700 p.s.i.

EXAMPLE XIV

Following the procedure of Example VI, 0.1% by weight 2,5-dimethyl-2,5-bis(tert-butylperoxy) hexyne-3 and 99.9% by weight "Profax 6501" polypropylene are blended and extruded into monofilaments. The resultant filaments had a diethyl ether solubility of 0.7%, an initial tangential modulus of 13,900, an isotacticity content determined by infrared of 79%, a melting point peak at 168° C., a tensile strength of 2,400 p.s.i. and the sample failed during testing for elastic recovery. The number average and weight average molecular weight of the filaments are 16,900 and 69,600 respectively.

EXAMPLE XV 0.01% by weight 2,5-dimethyl-2,5-bis(tert-butylperoxy) hexyne-3, 4% by weight tris-(2,3-dibromopropyl) phosphate and 96% "Profax 6501" polypropylene are premixed, blended and extruded following the procedure of Example II. The resultant monofilaments have a corrected diethyl ether solubility of about 1%, an elastic recovery of 10%, an initial tangential modulus of 17,450 p.s.i., an isotacticity as determined by infrared of 65% and a melting point peak at 150° C.

EXAMPLE XVI 0.1% by weight 2,5-dimethyl-2,5-bis(tert-butylperoxy) hexyne-3, 0.04% by weight tris-(2,3-dibromopropyl) phosphate, 0.5% by weight stearic acid are premixed, blended with about 99.4% by weight "Profax 6501" polypropylene and extruded into monofilaments following the procedure of Example II. The filaments have a corrected diethyl ether solubility of 1.4%, an initial tangential modulus of 68,300 p.s.i., an isotacticity (as determined by infrared) of 63.4%, a melting point peak at 154° C., a number average molecular weight of 20,100 and a weight average molecular weight of 71,300.

EXAMPLE XVII 0.1% by weight 2,5-dimethyl-2,5-bis(tert-butylperoxy) hexyne-3 3.8% by weight tris-(2,3-dibromopropyl) phosphate 0.2 stearic acid and 96 "Profax 6501" polypropylene are premixed, blended and extruded into monofilaments following the procedure of Example II. The monofilaments have a corrected diethyl ether solubility of 74.8%, an isotacticity content (as determined by infrared) of 25.5%, a melting point peak at 65° C. and an elastic recovery of 98%.

EXAMPLE XVIII 0.3% by weight dicumyl peroxide, 2% tris-(2,3-dibromopropyl) phosphate, 0.5% stearic acid and 97.2% "Profax 6501" polypropylene are premixed, blended and extruded into monofilaments following the procedure of Example II. The monofilaments have a corrected diethyl ether solubility of 70.3%, a helical isotactic content (as determined by infrared) of 25%, a melting point peak at 65° C., a number average molecular weight of 61,000 and a weight average molecular weight of 248,000.

Two grams of the monofilaments so produced are dissolved in orthodichlorobenzene and the resultant viscous liquid is poured over glass wool. Acetone is poured over the orthodichlorobenzene solution and the rearranged polypropylene is precipitated. The precipitated polypropylene is placed into a Soxhlet extractor and solvent extracted with acetone, a known solvent for tris-2,3-dibromopropyl) phosphate. After extraction the polymer is recovered by dissolving in orthodichlorobenzene. The recovered polymer is analyzed for bromine using X-ray analysis and it is found to have about 0.01% by weight bromine present. The polymer is reprecipitated, dried and tested, and no significant changes in the physical property values earlier reported in this example are found.

EXAMPLE XIX 0.01% by weight 2,5-dimethyl-2,5-bis(tert-butylperoxy) hexyne-3, 0.04% by weight tris-(2,3-dibromopropyl) phosphate, 0.002% by weight stearic acid and 99.94% by weight "Profax 6501" polypropylene are premixed, blended and extruded following the procedure of Example II. The monofilaments have a corrected diethyl ether solubility of about 1%, a melting point peak at 163° C. and an elastic recovery of about 9%.

EXAMPLE XX

Following the procedure of Example II, 0.1% by weight 2,5-dimethyl-2,5-bis(tert-butylperoxy) hexyne -3, 0.04% by weight tris-(2,3-dibromopropyl) phosphate, 0.001% by weight stearic acid and 99% by weight "Profax 6501" polypropylene are premixed, blended and extruded into monofilaments. These monofilaments have a corrected diethyl ether solubility of 1.2%, a helical isotactic content of 77%, a melting point peak at 159° C. and an elastic recovery of 7%.

EXAMPLE XXI

Following the procedure of Example II, 0.1% by weight dicumyl peroxide, 4% by weight tris-(2,3-dibromopropyl) phosphate, 0.5% by weight stearic acid and 95.4% "Profax 6501" polypropylene are premixed, blended and extruded into monofilaments having a diethyl ether solubility of 24%, an isotacticity as determined by infrared of 44%, and a melting point peak at 58° C.

EXAMPLE XXII

Following the procedure of Example II, 3.8% by weight of tris-(2,3-dibromopropyl) phosphate and 0.2% by weight of stearic acid were premixed with dicumyl peroxide as follows:

| Example: | Percent by wt. dicumyl peroxide |
|---|---|
| XXII | 0.00 |
| XXIII | 0.01 |
| XXIV | 0.04 |
| XXV | 0.05 |
| XXVI | 0.06 |
| XXVII | 0.08 |
| XXVIII | 0.1 |
| XXIX | 0.15 |
| XXX | 0.2 |
| XXXI | 0.3 |
| XXXII | 0.5 |
| XXXIII | 1 |

In each example the premixture is blended with sufficient "Profax 6501" polypropylene to insure that the weight percent of the above given bromine compound, dicumyl peroxide, stearic acid plus the particulate polypropylene combine to provide 100% by weight. In each instance the resultant mixture is extruded into monofilament form and quenched in water. Each such resultant polymer is tested as indicated below.

| Example | Diethyl ether solubility (corrected) | Elastic recovery, Percent | Polarized light, microscopic optical crystallinity | Shrinkage at 180° F. of 6:1 oriented filaments, percent | Tack temp., (°F.) | Tensile strength of unoriented filaments p.s.i. |
|---|---|---|---|---|---|---|
| XXII | 1.0 | 6 | Very large crystals | 3 | 350 | 7,700 |
| XXIII | 1.2 | 6 | ----do---- | 3 | 300 | 7,500 |
| XXIV | 0.7 | 10 | ----do---- | 10 | | 5,000 |
| XXV | 6.2 | 16 | Large crystals | 44 | | 6,700 |
| XXVI | 0.8 | 8 | Small | 6 | 250 | 7,100 |
| XXVII | | 25 | ----do---- | 67 | | 7,700 |
| XXVIII | 7.3 | 30 | Slightly crystalline | 74 | 225 | 6,100 |
| XXIX | 28.3 | 70 | Noncrystalline | 82 | 200 | 4,600 |
| XXX | 57.6 | 76 | ----do---- | 81 | 180 | 4,100 |
| XXXI | 82.9 | 92 | ----do---- | 66 | 150 | 2,200 |
| XXXII | 90.7 | | ----do---- | (1) | 100 | 500 |
| XXXIII | | | | (1) | | |

[1] Not orientable.

The material produced via Example XXXIII was extremely elastic and very Tacky at room temperature. The tack temperature was less than 100° F.

EXAMPLE XXXIV 0.3% by weight 2,5 - dimethyl - 2,5 - bis(tert butyl peroxy) hexane, 3.8% by weight tris-(2,3-dibromopropyl)phosphate, 0.2% by weight stearic acid and 95.7% by weight "Profax 6501" polypropylene are premixed, blended and extruded into monofilaments following the procedure of Example II. The monofilaments have a corrected diethyl ether solubility of 64% and elastic recovery of 73%, a tensile strength of 80 p.s.i. and a tack temperature of less than 100° F.

Additionally, the process disclosed and described herein can be utilized to sterically rearrange other stereoregular poly-α-olefins such that significant similar changes in physical properties likewise result.

It will be apparent that many widely different embodiments of this invention may be made without departing from the spirit and scope thereof, and therefore it is not intended to be limited except as indicated in the appended claims.

What is claimed is:

1. An isotactic-randiotactic stereoblock polypropylene characterized by crystallinity and at least 1% diethyl ether solubility, said randiotactic block portion comprising an average of from about 40% to about 60% heterotactic segments, from about 20% to about 30% isotactic segments, and from about 20% to about 30% syndiotactic segments, said isotactic-randiotactic stereoblock polypropylene being further characterized by a 100 megacycle NMR spectra defined by doublets at (a) 83 and 89 c.p.s., (b) 85 and 79 c.p.s. and (c) 87 and 81 c.p.s., wherein the area given by doublets (c) is about twice that area given by doublets (b).

2. An isotactic-randiotactic stereoblock polypropylene as defined in claim 1 characterized by at least about 1% diethyl ether solubility and a melting point peak between about 165° C. and about 50° C.

3. An isotactic-randiotactic stereoblock polypropylene as defined in claim 1 characterized by a diethyl ether solubility of at least about 1% and a helical isotactic content of from about 80% to about 15%.

4. The polypropylene of claim 3 wherein the diethyl ether solubility is at least about 2%, the melting point peak is between about 120° C. and about 50° C. and the helical isotactic content is between about 65% to about 15%.

5. The polypropylene of claim 3 wherein the diethyl ether solubility is at least about 10%, the melting point peak is between about 105° C. and 50° C. and the helical isotactic content is between about 50% to about 15%.

6. A substantially randiotactic polypropylene as defined in claim 1 characterized by a diethyl ether solubility of about 100% and a weight average molecular weight of at least about 190,000.

7. An isotactic-randdiotactic stereoblock polypropylene as defined in claim 1 characterized by a diethyl ether solubility of at least about 12%, and an elastic recovery of from about 10% to about 100%.

8. The polypropylene of claim 7 further characterized by an initial tangential modulus of from about 68,300 p.s.i. to about 25 p.s.i.

9. An isotactic-randiotactic stereoblock polypropylene as defined in claim 1 characterized by a diethyl ether solubility of at least about 1% and a weight average molecular weight of at least about 65,000.

10. A method for preparing an isotactic-randiotactic polypropylene which comprises reacting an amount of free radical initiator sufficient to provide an activity equivalent to at least about 0.001% by weight of active oxygen and sufficient bromine compound to provide at least about 0.005% by weight active bromine wherein said active bromine and said active oxygen equivalent is present in a ratio of at least about 0.2 to 1, with substantially isotactic polypropylene at a temperature within the range of from about 325° F. to about 600° F.

11. The process of claim 10 wherein said free radical initiator is an organic peroxide.

12. The process of claim 11 wherein said organic peroxide has at least about 0.001% by weight active oxygen and wherein said active bromine and said active oxygen are present in a ratio of at least about 0.2:1 in the polymer.

13. The process of claim 12 wherein the active bromine to active oxygen ratio is about 10:1.

14. A method for preparing an isotactic-randiotactic polypropylene which comprises reacting an amount of free radical initiator sufficient to provide an activity equivalent to at least about 0.004% by weight of active oxygen and sufficient bromine compound having to provide about 0.05% by weight active bromine in the polymer, wherein said active bromine and said active oxygen equivalents are present in a ratio of at least about 0.2:1, with substantially isotactic polypropylene at a temperature within the range of from about 325° F. to about 600° F.

15. The process of claim 14 wherein said free radical initiator is an organic peroxide.

16. The process of claim 15 wherein said organic peroxide has at least about 0.004% by weight active oxygen and wherein said active bromine and said active oxygen are present in a ratio of at least about 0.2:1 in the polymer.

17. The process of claim 15 wherein the active bromine to active oxygen ratio is about 10:1.

18. A method for preparing an isotactic-randiotactic polypropylene which comprises reacting a free radical initiator having at least about 0.01% by weight of an active oxygen equivalent, and a bromine compound having at least about 0.1% by weight active bromine, wherein said active bromine and said active oxygen equivalents are present in a ratio of at least about 0.2:1 in the polymer with substantially isotactic polypropylene at a temperature within the range of from about 325° F. to about 600° F.

19. The process of claim 18 wherein said free radical initiator is an organic peroxide.

20. The process of claim 18 wherein said organic peroxide has at least about 0.01% by weight active oxygen and wherein said active bromine and said active oxygen are present in a ratio of at least about 0.2:1 in the polymer.

21. The process of claim 18 wherein the active bromine to active oxygen ratio is about 10:1.

References Cited

Natta and Danusso, Stereoregular Polymers and Stereospecific Polymerizations, vol. I, p. 215 (1967).

JOSEPH L. SCHOFER, Primary Examiner

R. A. GAITHER, Assistant Examiner